United States Patent
Folsom et al.

(10) Patent No.: US 9,139,287 B2
(45) Date of Patent: Sep. 22, 2015

(54) PROPELLER BLADE WITH CARBON FOAM SPAR CORE

(75) Inventors: Michael E. Folsom, Ellington, CT (US); Blair A. Smith, South Windsor, CT (US); David P. Nagle, Westfield, MA (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 615 days.

(21) Appl. No.: 13/533,218

(22) Filed: Jun. 26, 2012

(65) Prior Publication Data

US 2013/0343898 A1    Dec. 26, 2013

(51) Int. Cl.
 *B64C 11/26* (2006.01)
 *B64C 11/22* (2006.01)
 *B64C 11/24* (2006.01)

(52) U.S. Cl.
 CPC .............. *B64C 11/26* (2013.01); *B64C 11/22* (2013.01); *B64C 11/24* (2013.01); *Y10T 29/49337* (2015.01)

(58) Field of Classification Search
 CPC ........................ B64C 11/26; Y10T 29/49337
 See application file for complete search history.

(56) References Cited

U.S. PATENT DOCUMENTS

| | | | | |
|---|---|---|---|---|
| 2,648,388 A * | 8/1953 | Haines et al. | ............. | 416/95 |
| 4,268,571 A * | 5/1981 | McCarthy | ............. | 442/226 |
| 4,470,862 A * | 9/1984 | More et al. | ............. | 156/245 |
| 4,648,921 A * | 3/1987 | Nutter, Jr. | ............. | 156/77 |
| 4,784,575 A * | 11/1988 | Nelson et al. | ............. | 416/226 |
| 4,806,077 A * | 2/1989 | Bost | ............. | 416/226 |
| 4,810,167 A * | 3/1989 | Spoltman et al. | ......... | 416/229 A |
| 5,022,825 A * | 6/1991 | Violette et al. | ............. | 416/205 |
| 5,127,802 A * | 7/1992 | Carlson et al. | ............. | 416/226 |
| 5,222,297 A * | 6/1993 | Graff et al. | ............. | 29/889.71 |
| 2009/0111901 A1* | 4/2009 | Allen | ............. | 521/51 |
| 2010/0209254 A1* | 8/2010 | Lafont | ............. | 416/219 R |
| 2010/0320314 A1* | 12/2010 | Balaskovic | ............. | 244/96 |
| 2013/0017093 A1* | 1/2013 | Coupe et al. | ............. | 416/230 |
| 2013/0136614 A1* | 5/2013 | Nagle et al. | ............. | 416/230 |
| 2013/0136615 A1* | 5/2013 | Nagle et al. | ............. | 416/230 |
| 2013/0136616 A1* | 5/2013 | Prunet | ............. | 416/230 |
| 2013/0177422 A1* | 7/2013 | Bianchi et al. | ............. | 416/146 R |
| 2013/0272893 A1* | 10/2013 | Fabre et al. | ............. | 416/226 |
| 2013/0280079 A1* | 10/2013 | Smith et al. | ............. | 416/223 R |
| 2013/0280084 A1* | 10/2013 | Nagle et al. | ............. | 416/226 |
| 2013/0287584 A1* | 10/2013 | Nagle et al. | ............. | 416/226 |
| 2013/0343898 A1* | 12/2013 | Folsom et al. | ............. | 416/226 |
| 2014/0133995 A1* | 5/2014 | Nagle et al. | ............. | 416/226 |
| 2015/0013160 A1* | 1/2015 | Mathon et al. | ............. | 29/889.6 |
| 2015/0064013 A1* | 3/2015 | Measom et al. | ............. | 416/226 |

FOREIGN PATENT DOCUMENTS

EP    0037987 A  *  10/1981

OTHER PUBLICATIONS

Mercuri, R.A., Wessendorf, T.R., Criscione, J.M., "Carbon Foam—Its Preparation and Properties", Union Carbide Corporation, Jan. 1968.*

* cited by examiner

*Primary Examiner* — Edward Look
*Assistant Examiner* — Christopher R Legendre
(74) *Attorney, Agent, or Firm* — Cantor Colburn LLP

(57) ABSTRACT

According to one embodiment, a propeller blade includes a carbon foam core and a structural layer that surrounds at least a portion of the carbon foam core.

6 Claims, 4 Drawing Sheets

PROPELLER BLADE WITH CARBON FOAM SPAR CORE

BACKGROUND OF THE INVENTION

The present invention relates to propellers and, in particular, to propeller blades formed having a carbon foam spar core.

Modern propeller blades typically include root portions which extend into the hub arm of the hub of the propeller system and which are secured to and rotatable relative to the hub arm via a retention assembly. Typically the retention assembly includes one or a plurality of ball bearing assemblies which permit the rotation of the blade in the hub arm for accomplishing pitch change of the blade for altering the speed of the propeller and accordingly, the aircraft.

The blades are typically formed by surrounding a foam spar core with a resin impregnated fabric that is braided on to the foam spar core. Leading and trailing edges of the blade are then formed over the fabric and surrounded by, for example, a Kevlar sock. Such blades are light and effective for their intended purposes.

BRIEF DESCRIPTION OF THE INVENTION

According to one embodiment, a propeller blade that includes a carbon foam core and a structural layer that surrounds at least a portion of the carbon foam core is disclosed.

According to another embodiment, a method of forming a propeller blade is disclosed. The method includes: forming a carbon foam core; and disposing a structural layer over at least a portion of the carbon foam core.

According to another embodiment, a propeller blade that includes a carbon foam core stub, a structural layer surrounding the carbon foam core stub and a conventional foam surrounding the carbon foam core stub and within the structural layer is disclosed.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
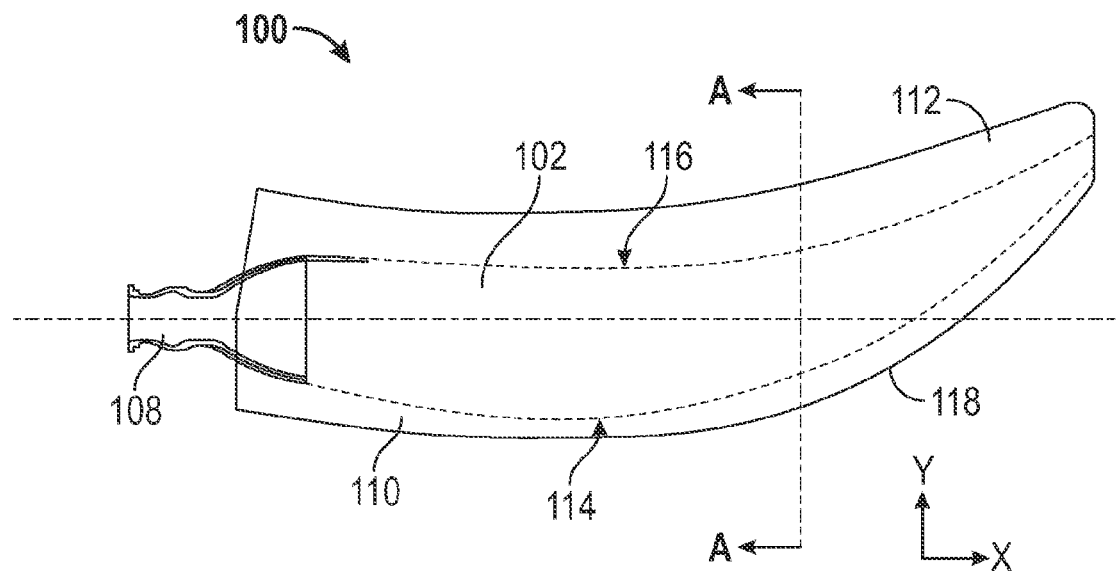
FIG. 1 is a plan-view of a prior art propeller blade.
Figure 2:
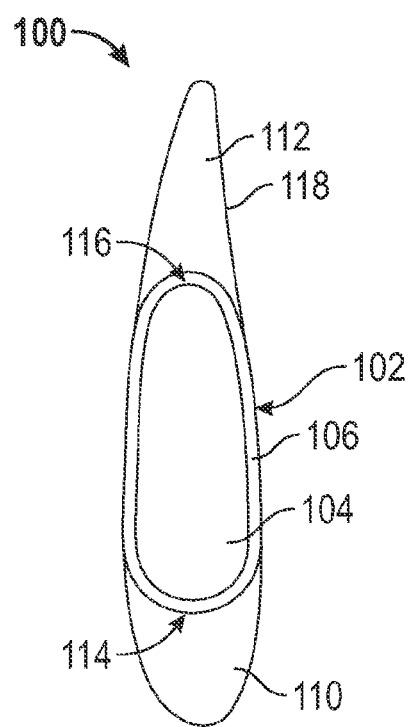
FIG. 2 is a cross-section of the propeller blade shown in FIG. 1.

Referring now to FIG. 1, a plan view of a conventional propeller blade 100 is illustrated and will be used to define certain terms, explain how a propeller blade is generally made, and to illustrate the differences between embodiments of the present invention and the prior art. Reference will also be made to FIG. 2, which is a cross-section of the propeller blade 100 of FIG. 1 taken along line A-A, for these purposes. For convention, and as shown in the legend in FIG. 1, direction X shall be referred to as the span wise direction and direction Y shall be referred to as the chordwise direction.

The blade 100 is formed by first forming a spar 102. The spar 102 includes a spar foam core 104 surrounded by a structural layer 106. The core 104 is typically formed of a foam material that is injected into a mold. The mold can include a layer of fiberglass on the walls thereof that to which the foam of the core 104 adheres. As such, the core 104 can be surrounded by a layer of fiberglass (not shown). The foam that forms the core 104 is typically selected from one of: polyurethane (PU), polyisocyanurate, or polymethacrylimide (PMI).

The structural layer 106 is typically formed of a dry braided carbon fiber which is subsequently resin injected or a resin-impregnated fabric material (e.g. resin impregnated carbon fiber fabric) and disposed such that it surrounds the core 104 (and the fiberglass layer if it is included). The structural layer 106 is typically braided onto the core 104. In some cases, the spar 102 is heated to set the resin in the structural layer 106. Considerable thermal stresses can occur in the core 104 as the spar 102 is cooled due to the differences in the coefficients of thermal expansion (CTE) of the core 104 and the structural layer 106.

In some instances, the spar 102 is formed such that a portion of it is surrounded by a root portion 108 that allows the blade 100 to be connected to a hub (not shown). Rotation of the hub causes the blade 100 to rotate and, consequently, causes the generation of thrust to propel an aircraft. In the following discussion, it shall be assumed that the blade 100 rotates in the clockwise direction. The root portion 108 is sometimes referred to as a "tulip" in the industry and is typically formed of a metal.

After the spar 102 is formed, leading edge foam 110 and trailing edge foam 112 are formed on the leading and trailing edges 114, 116, respectively of the spar 102. The leading edge foam 110, trailing edge foam 112 and the spar 102 can then be encased in an outer layer 118. The outer layer 118 can be formed of Kevlar and be in the form of a sock that is pulled over the assembly that includes the leading edge foam 110, trailing edge foam 112 and the spar 102. Of course, the outer layer 118 could be formed in other manners as well.

As described above, considerable thermal stresses can occur in the core 104 as the spar 102 is cooled due to the differences in the coefficients of thermal expansion (CTE) of the core 104 and the structural layer 106. In addition, thermal stresses can be created between the core 104 and the structural layer 106 due to the wide range of temperatures experienced by the propeller blade 100 in normal operation.

According to one embodiment, rather than utilizing the foam core 104 described above, at least a portion of the foam core is replaced with a carbon foam. In one embodiment, the entire foam core 104 is replaced with a carbon foam. In another embodiment, only a portion of the foam core is replace with carbon foam. The carbon foam is coupled to the remaining portions of the conventional foam in one embodiment.

Provision of a carbon foam spar may provide for a better bond between the core and the structural layer 106. This may be due to the fact that a carbon foam has a higher strength and greater bonding surface area due to the potential for an open cell structure than the polyurethane foam typically used which has a resin skin on the surface that closes off the cell structure. In addition, as the carbon foam spar is formed of carbon, it may exhibit the same or similar thermal properties as the carbon that may exist in the structural layer. It shall be understood that the carbon foam could be used to replace other portions of the blade that include polyurethane foam such as, for example, the leading and trailing edge foam.

In one embodiment, the carbon foam may be coated with either a film or paste adhesive to optimize bond strength to the surrounding structural layer. The carbon foam core may extend along the full length of the blade, or its length may be optimized to reduce weight.

As used herein, a carbon foam shall refer to a cellular structure consisting of a solid carbon, containing a large volume fraction of gas-filled pores. The carbon foam used herein can have pores that are sealed (closed-cell foam), or they can form an interconnected network (open-cell foam). The carbon foam can be formed from a variety of precursor materials such as coal or petroleum tar pitch, synthetic pitches or organic resins and characteristically have a very high porosity level of approximately 75-95%, although the actual porosity level used will be dependent upon the desired density. The strength of carbon foam possesses a power law relationship to its density; i.e., a 20% dense material is more than twice as strong as a 10% dense material. In general, the carbon foam has mechanical properties that are superior to polyurethane foams while exhibiting much higher temperature capability and lower coefficient of thermal expansion (CTE). The lower CTE of the carbon foam may be a closer match to the CTE of the carbon fiber spar laminate and Kevlar shell laminate.

Figure 3:
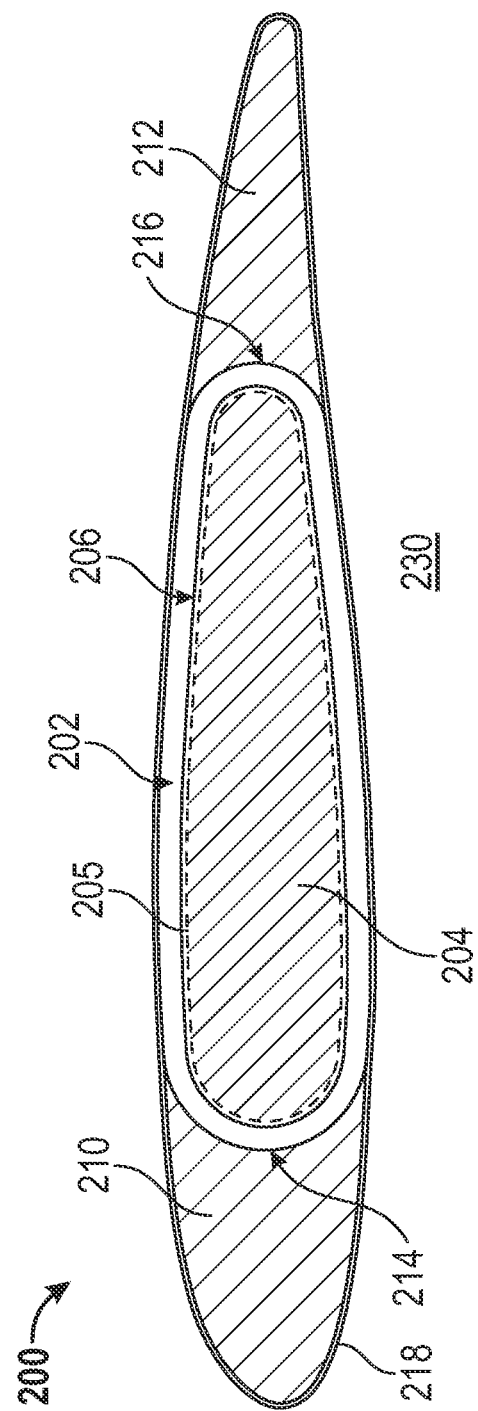
FIG. 3 illustrates a cut-away side view of a propeller blade having a spar core formed of a carbon foam according to one embodiment.

FIG. 3 illustrates a cut-away side view of a propeller blade 200 according to one embodiment of the present invention. The blade 200 is formed by first forming a spar 202. The spar 202 includes a carbon spar foam core 204. In any of the embodiments shown herein, the carbon foam portion of the blade (in this case carbon spar foam core 204) is formed by machining a block of carbon foam to a particular desired shape. The block may be made of a single piece or may be made by adhesively bonding smaller blocks together using a suitable paste or film adhesive. The individual smaller blocks may have the same density where uniform properties are desired, or blocks with differing densities may be used to tailor the properties of the machined carbon foam piece.

According to one embodiment, an adhesive layer 205 is formed on the outside of the core 204. The adhesive layer 205 can be any suitable film or paste adhesive and/or a prepreg material (either carbon fiber or glass fiber prepreg materials would be suitable). The use of an adhesive and or prepreg material may assist in sealing the carbon foam against resin intrusion during the subsequent Resin Transfer Molding (RTM) process and/or optimize the bond strength to the surrounding composite material. Examples of suitable adhesives include epoxy, polyurethane and polysulfide adhesives.

A structural layer 206 can then be formed around the adhesive layer 205. In one embodiment, the structural layer 206 is formed of dry braided carbon fiber which is subsequently resin injected or a resin-impregnated fabric material (e.g. resin impregnated carbon fiber fabric) and disposed such that it surrounds the core 204 (and the fiberglass layer if it is included). In some cases, the spar 202 is heated to set the resin in the structural layer 206. This is referred to as RTM in the industry.

After the spar 202 is formed, leading edge foam 210 and trailing edge foam 212 are formed on the leading and trailing edges 214, 216, respectively of the spar 202. It shall be understood that the leading and trailing edge foam 210, 212 could be formed of carbon foam in one embodiment or of any other type of foam currently (e.g., polyurethane or metallic) used in composite propeller blade construction. The leading edge foam 210, trailing edge foam 212, and the spar 202 can then be encased in an outer layer 218. The outer layer 218 can be formed of Kevlar and in the form of a sock that is pulled over the assembly that includes the leading edge foam 210, trailing edge foam 212, and the spar 202. Of course, the outer layer 218 could be formed in other manners as well.

Figure 4:
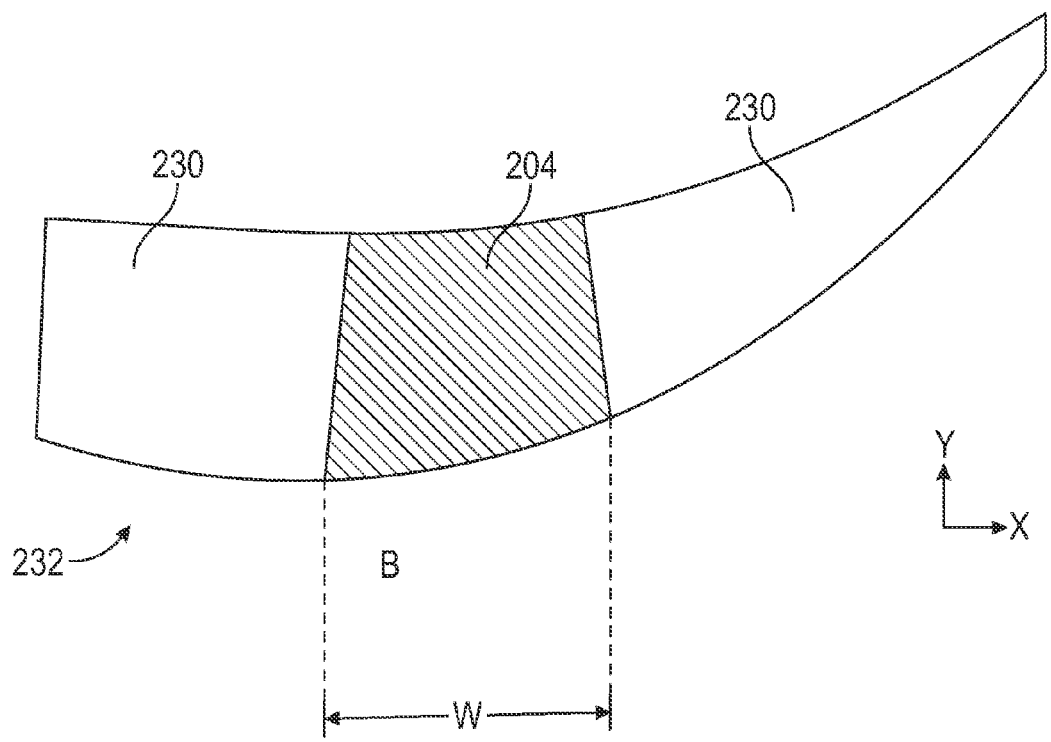
FIG. 4 is a plan view of a spar having a carbon foam core portion.

FIG. 4 shows a plan view of a spar core 232 according to one embodiment. In this embodiment, the spar core 232, a carbon foam core portion 204, and conventional foam core portions 230. Such a spar core 232 could be formed, for example, by forming a conventional foam spar core as described above and cutting a portion sized to receive the carbon foam core portion 204. The conventional 230 and carbon 204 foam core portions can then be bonded together, for example, with an adhesive material. The carbon foam core portion 204 could be formed in as blocks and then machined into a desired shape in one embodiment. As shown, the desired shape includes a desired span wise length (w). Incorporation of carbon foam may reduce or prevent possible cracking which may occur due to thermal stresses between the structural layer 206 (FIG. 2) and spar core 232. This is achieved because the carbon foam has a higher strength and a lower coefficient CTE than the polyurethane foam. The lower CTE of the carbon foam is particularly beneficial, as it provides a closer match to the CTE of the carbon fiber spar laminate and Kevlar shell laminate.

Figure 5:
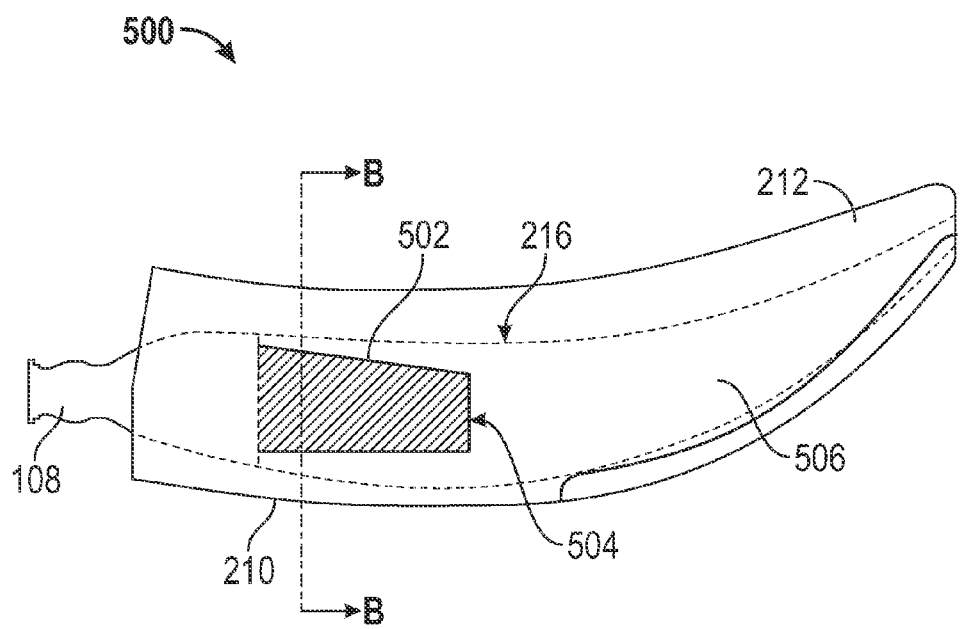
FIG. 5 is a plan-view of a propeller blade according to another embodiment.
Figure 6:
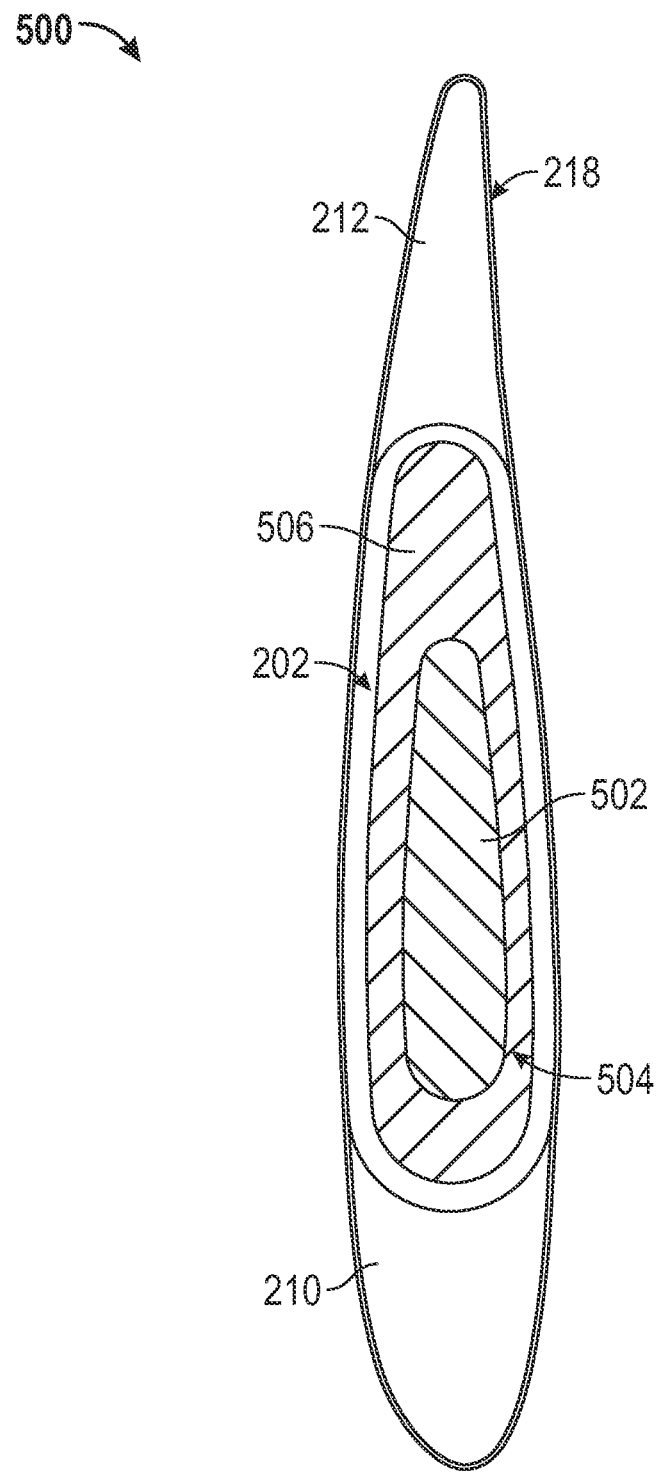
FIG. 6 is a cross-section of the propeller blade shown in FIG. 5.

FIG. 5 illustrates another embodiment of propeller blade 500. In this embodiment, a spar core 216 is formed from a spar stub 502 surrounded by a conventional foam 506. In one embodiment, the spar stub 502 is formed of a carbon foam and is joined to the tulip 108. To form the spar core 216, the spar stub 502 is machined to the desired size and can then be inserted into a mold that has the remaining area filled with conventional foam 506 in the manner described above. According to one embodiment, an adhesive layer 504 surrounds the spar stub 502. It shall be understood that any or all of leading edge foam 210 and trailing edge foam 212 could be formed of either conventional or carbon foam. Further, and as best seen in FIG. 6, which is a cross section of FIG. 5 taken along line B-B, it shall be understood that in one embodiment, the spar 216 is formed such the conventional foam 506 is disposed between structural layer 202 and the spar stub 502.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A propeller blade comprising:
  a carbon foam core stub;
  a structural layer surrounding the carbon foam core stub;
  foam surrounding the carbon foam core stub and within the structural layer;
  a leading edge section formed outside of the structural layer; and
  a trailing edge section formed outside of the structural layer and opposite the leading edge section;
  wherein at least one of the leading and trailing edges is formed of a carbon foam.

2. The propeller blade of claim 1, wherein the foam is polyurethane foam, polyisocyanurate foam, or polymethacrylimide foam.

3. The propeller blade of claim 1, wherein the carbon foam forming the carbon foam core stub is an open celled carbon foam.

4. The propeller blade of claim 1, wherein the carbon foam forming the carbon foam core stub is a closed celled carbon foam.

5. The propeller blade of claim 1, further comprising:
a layer of adhesive at least partially disposed between the carbon foam core stub and the foam.

6. The propeller blade of claim 1, further comprising:
a root disposed within the structural layer at an end of the propeller blade, wherein the carbon foam core stub extends from the root into the foam.

\* \* \* \* \*